Patented Sept. 17, 1935

2,014,489

UNITED STATES PATENT OFFICE 2,014,489

ACID SULPHURIC ACID ESTERS OF LEUCO DERIVATIVES OF VAT DYESTUFFS

Wilhelm Bauer, Leverkusen-Wiesdorf, and Erwin Kramer, Cologne-Deutz, Germany, assignors, by mesne assignments, to Durand & Huguenin A.-G., Basel, Switzerland, a corporation of Switzerland No Drawing. Application July 11, 1933, Serial No. 679,990. In Germany July 20, 1932

1 Claim. (Cl. 260—99.12)

This invention relates to new acid sulphuric acid esters of leuco derivatives of vat dyestuffs.

It is the object of the present invention to provide new acid sulphuric acid esters of leuco derivatives of vat dyestuffs or salts thereof, yielding when dyed and developed on animal or vegetable fibres in the usual manner strong and clear yellow shades of superior fastness properties.

The new acid sulphuric acid esters in question are derived from phthaloylfluoranthenes as can be obtained, for example, by reacting upon fluoranthene or its substitution products with phthalic anhydride or a substitution product thereof, and treating the keto carboxylic acids thus obtained, if desired, after having introduced into the same further substituents, with ring closing agents. Obviously, the phthaloylfluoranthenes thus obtained may likewise be subjected to any desired substitution reaction. The phthaloylfluoranthenes thus obtainable correspond to the probable formula

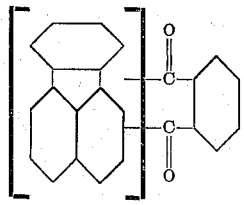

wherein the nuclei may be substituted, for example, by halogen atoms (one, two or more chlorine or bromine atoms) or alkyl groups ($CH_3$, $C_2H_5$, $C_3H_7$ etc.).

The transformation of the said phthaloylfluoranthenes into their leuco acid sulphuric acid esters or the salts thereof may be performed in any desired known manner. For example, the phthaloylfluoranthenes may be transformed into their leuco compounds and the latter caused to be reacted upon by sulphur trioxide, agents containing free sulphur trioxide or agents splitting off sulphur trioxide under the conditions of working, in the presence of a tertiary organic base, such as pyridine, quinoline etc. Furthermore, the phthaloylfluoranthenes may be treated with copper or another suitable metal or with hydrogen sulphide, anhydrous sodium sulphide, anhydrous alkali metal or earthalkali metal polysulphides etc. in the presence of a tertiary organic base, whereby reduction occurs, and the reduction products thus obtained esterified, without isolating the same, by means of an esterifying agent as mentioned above. The isolation of the acid sulphuric acid esters thus obtained may be performed in the usual manner, for example, by removing the tertiary base by steam distillation and salting out.

The products thus obtainable correspond in their free form to the probable formula:—

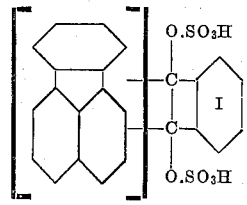

wherein the carbon atoms being substituted by the —$O.SO_3H$ groups stand in vicinal positions of the fluoranthene nucleus, and wherein the nuclei may be substituted by monovalent substituents, such as one, two or more halogen atoms, or alkyl groups. The substituents may stand as well in the fluoranthene nucleus as in the benzene nucleus marked I.

The new products are in form of their alkali metals salts yellow compounds being easily soluble in water, yielding, when dyed or printed on textile fibres, after development clear and strong yellow shades of excellent fastness properties, especially to light.

It is to be mentioned that the property of the acid sulphuric acid esters of leuco phthaloylfluoranthenes to yield strong shades on textile fibres is most surprising, since the phthaloylfluoranthenes themselves are only weak vat dyestuffs.

The following examples illustrate the invention, without limiting it thereto, the parts being by weight:—

EXAMPLE 1

*Leuco sulphuric acid ester of the phthaloylfluoranthene of the melting point of 333° C.*

Into an esterification mixture, being obtained by gradually introducing 30 parts of chlorosulphonic acid into 334 parts of anhydrous pyridine, 33.4 parts of the powdered strongly dried leuco compound of the phthaloylfluoranthene of the melting point 333° C. are introduced while removing the air by means of carbonic acid. Thereupon the mixture is gradually heated in a current of carbonic acid to a temperature of 50° C. and maintained at this temperature for two hours under continuous stirring. A brownish colored solution is obtained, which is introduced, after cooling, into 2000 parts of a 2% caustic potash solution with the addition of 5 parts of potassium carbonate. The alkaline solution is then freed from pyridine by means of steam distillation, filtered by suction and salted out with potassium chloride. The potassium salt of the ester separates in yellow needles, which are easily soluble in water with a characteristic, intensely yellowish green fluorescence. After the addition of a mineral acid and a weak oxidizing agent, for example, nitrite or ferric chloride, an insoluble, greenish-yellow precipitate separates from the yellow solution.

The ester yields when printed or dyed according to a suitable method and developed with oxidizing agents on vegetable or animal fibres, strong, very clear greenish-yellow colorations of excellent fastness properties.

The phthaloylfluoranthene of the melting point of 333° C. may be obtained, for example, when heating to boiling the 12-fluoranthenoyl-ortho-benzoylchloride of the melting point of 163° C. (see Annalen der Chemie, vol. 496, page 187) in trichlorobenzene, and, after cooling the solution to 50° C., filtering by suction the separated crystals. On cooling, the isomeric phthaloyl-fluoranthene crystallizes from the mother liquor and has the melting point of 240° C. after recrystallization from organic solvents.

EXAMPLE 2

*Leuco sulphuric acid ester of bromophthaloyl-fluoranthene*

When substituting in the process described in Example 1 the 33.4 parts of leucophthaloyl-fluoranthene by 41.3 parts of the dried leuco compound of bromo phthaloylfluoranthene, which can be obtained, for example, by brominating phthaloylfluoranthene of the melting point of 333° C., the reaction performs in a similar manner. The orange-yellow ester obtained is easily soluble in water with the same coloration but a weaker fluorescence and also yields on the fibre very greenish-yellow shades of excellent fastness properties.

EXAMPLE 3

When using instead of the bromophthaloyl-fluoranthene described in Example 2 a product obtainable by brominating 12-fluoranthenoyl-ortho-benzoic acid of the melting point of 212° C. (see Annalen der Chemie, vol. 496, pages 186–187) separating it from a difficultly soluble isomeride by conversion into its easily soluble sodium salt, and inducing ring closure by means of concentrated sulphuric acid, an orange colored ester is obtained, the sodium salt of which is soluble in water with an orange-yellow coloration and with a weak fluorescence, yielding when developed on the fibre very clear, greenish-yellow shades of excellent fastness.

The isomeric bromo-12-fluoranthenoyl-ortho-benzoic acid, the sodium salt of which is very difficultly soluble in water, yields after ring closure with benzoylchloride an isomeric bromo-phthaloylfluoranthene, which after esterification in the manner described above supplies a light yellow ester salt, being soluble in water without fluorescence with a clear yellow coloration and can be developed on the fibre to an orange-yellow shade of excellent fastness properties.

EXAMPLE 4

*Leuco sulphuric acid ester of phthaloylfluoran-thene of the melting point of 240° C.*

33.2 parts of the phthaloylfluoranthene (M. P. 240° C.) are mixed with 20 parts of copper powder and then introduced, while leading in a current of carbonic acid, in an esterification mixture consisting of 330 parts of pyridine and 60 parts of chlorosulphonic acid at ordinary temperature. Thereupon the whole is heated under continuous stirring and while still introducing carbonic acid to a temperature of about 50–60° C., which temperature is maintained for 1½ hours. A brown solution is obtained, which is poured into ice water. The separating insoluble product is isolated and is dissolved with an excess of dilute potash solution while hot. The solution is freed from pyridine by steam distillation, filtered and salted out with potassium chloride. The potassium salt of the ester separates in soft masses, which soon become solid and can be isolated and carefully dried. The estersalt forms a brownish-yellow crystalline powder, which is easily soluble in water with a slight fluorescence. The yellow solution separates a yellow precipitate when treated with acid oxidizing agents. The ester yields, when dyed or printed on animal or vegetable fibres in a suitable manner and developed with acid oxidizing agents, strong yellow colorations, which have a more reddish tint than those obtainable with the ester described in Example 1 and which have excellent fastness.

We claim:—

The leuco sulphuric acid esters of phthaloyl-fluoranthenes wherein the nuclei may be substituted by halogen atoms or alkyl groups, and wherein the carbon atoms being substituted by the —O.SO$_3$H groups are attached in vicinal positions of the fluoranthene radical, said compounds being yellow products, easily soluble in water, yielding on textile fibres strong and clear yellow shades of excellent fastness properties, especially to light.

WILHELM BAUER.
ERWIN KRAMER.